United States Patent [19]

Underwood

[11] Patent Number: 5,687,772
[45] Date of Patent: Nov. 18, 1997

[54] PROTECTIVE END CAP

[76] Inventor: Daniel Charles Underwood, 12 Lewisham Court, Birkdale, Queensland, 4159, Australia

[21] Appl. No.: 547,803

[22] Filed: Oct. 25, 1995

[30] Foreign Application Priority Data

Oct. 28, 1994 [AU] Australia .................................. PM9115

[51] Int. Cl.$^6$ ........................................................ F16L 55/10
[52] U.S. Cl. .......................... 138/96 R; 138/96 T; 138/89
[58] Field of Search ................................ 138/96 R, 89, 138/110, 96 T, 109, 178; 411/371–373, 520, 525, 526, 528; 215/306, 316, 317, 322, 355; 220/255, 256, 352, DIG. 19

[56] References Cited

U.S. PATENT DOCUMENTS

| | | | |
|---|---|---|---|
| 2,269,198 | 1/1942 | Hicks | 138/96 R |
| 4,303,101 | 12/1981 | Tholen | 138/96 R X |
| 5,048,571 | 9/1991 | Ellis | 138/89 X |
| 5,437,309 | 8/1995 | Timmons | 138/96 R X |

*Primary Examiner*—Patrick Brinson
*Attorney, Agent, or Firm*—Curtis, Morris & Safford, P.C.

[57] ABSTRACT

An end cap comprising a hollow base section 11 which can be fitted over the end of a bar. A larger cap section 12 is attachable to the base section 11 to project radially outward therefrom. The base section 11 includes a braced intermediate cap section 13 having a slot 14 into which a bar 14a (shown in phantom) can be fitted using a hand insertable snap action. The intermediate cap section 13 includes an eyelet 15 into which a tab 16 of the cap 12 is fitted as the tab 16 is manually pulled downward as shown in phantom at 17. The enlarged cap section 12 is snap fitted in place via the downwardly projecting legs 18 being forced into the slot 14 so that the shoulders 19 engage the slot.

4 Claims, 2 Drawing Sheets

PROTECTIVE END CAP

TECHNICAL FIELD

This invention relates to a protective end cap for covering the ends of exposed bars and in particular but not limited to a protective end cap for covering the ends of starter bars on construction sites.

BACKGROUND OF THE INVENTION

Construction workers are prone to be injured by projecting bars with upwardly projecting starter bars being the cause of major injuries due to persons falling upon the bars.

It has been proposed to cap starter bars and the present invention relates to a useful alternative to present proposals. Some present caps are only most useful in specific situations, it would be desirable to provide a cap arrangement of greater versatility to cater economically for situations of greater or lesser risk. For example, the risk of fatal injury is greater in the case of vertically projecting bars than for horizontally projecting bars.

SUMMARY OF THE INVENTION

In one aspect, there is provided an end cap comprising a hollow base section fittable over the end of a bar and a separately formed enlarged cap section, the cap section being attachable to the base section to provide a cap therefor projecting radially outwardly therefrom.

The hollow base section is typically a tube-like member projecting from an intermediate cap formed integrally with the tube from plastics material, the intermediate cap having a slot, the enlarged cap section having hand insertable clip means engagable in said slot to secure the enlarged cap section to the intermediate cap section.

Typically, the end cap includes a transverse slot or through hole through which an impact member can be located to extend outwardly and transversely from the cap. Typically, the enlarged cap section is securable to the intermediate cap section after the impact member is located in place. The hollow base is preferably telescopically slidable on a projecting bar and the enlarged cap section locates on and concentrically surrounds the hollow base section.

The end cap preferably includes an impact member secured to the hollow base section so that the impact member in use is located between the enlarged cap section the hollow base section. The impact member is preferably embedded in or otherwise secured to the hollow base section and formed from separate material, the impact member is retained in the base section upon removal of the enlarged cap section.

In order that the invention can be more readily understood and be put into practical effect, reference will now be made to the accompanying drawings which illustrate a preferred embodiment of the present invention and wherein:

Figure 1:
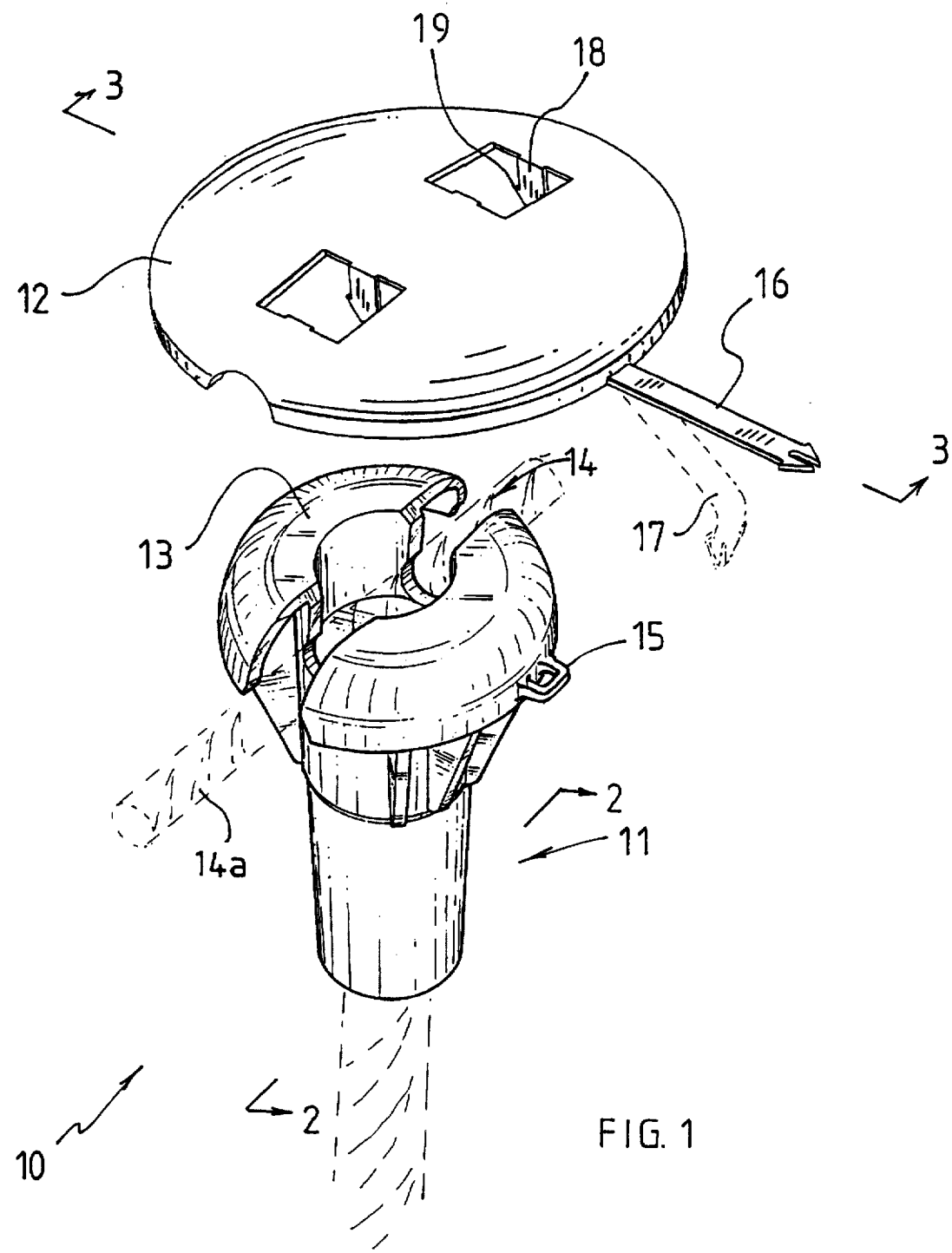
FIG. 1 is an exploded perspective view illustrating one embodiment of the present invention.

Referring to the drawings, there is illustrated an end cap 10 shown in its unassembled form in FIG. 1, the end cap comprising a hollow base section 11 which can be fitted over the end of a bar. A larger cap section 12 is attachable to the base section 11 to project radially outward therefrom.

As can be seen, the base section 11 includes a braced intermediate cap section 13 having a slot 14 into which a bar 14a (shown in phantom) can be fitted using a hand insertable snap action.

Figure 3:
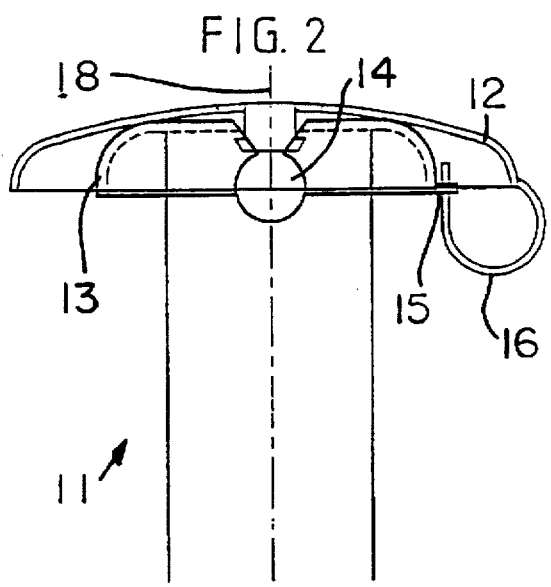

The intermediate cap section 13 includes an eyelet 15 into which a tab 16 of the cap 12 is fitted as the tab 16 is manually pulled downward as shown in phantom at 17. The enlarged cap section 12 is snap fitted in place via the downwardly projecting legs 18 being forced into the slot 14 so that the shoulders 19 engage the slot as illustrated in FIG. 3.

Figure 4:
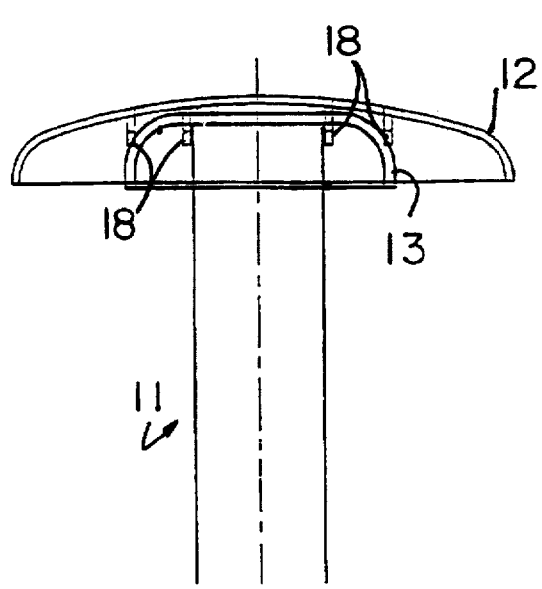
FIG. 4 is a view similar to that of FIG. 2, but illustrating a different sized base section.
Figure 2:
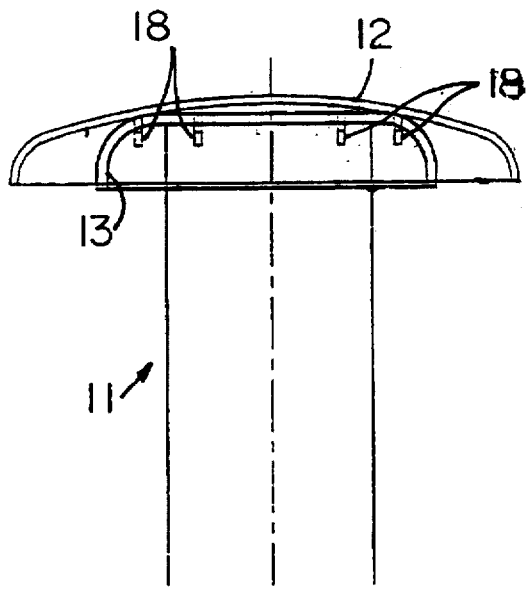
FIGS. 2 and 3 are respective sectional type views through 3—3 and 2—2 of an assembled cap of the type illustrated in FIG. 1.

The legs 18 are positioned at the spaced intervals as illustrated so that the enlarged cap section 12 is approximately 10 cm in diameter but the spacing is such that the enlarged cap section can be fitted into the slots of two different cap sizes with the cap sizes of FIGS. 2 and 4 being typical, each cap having tubes adapted to suit respective ranges of starter bar sizes commonly used on construction sites.

It will be appreciated that the enlarged cap section can be employed where it is desirable and need not be employed in lower risk application. For example horizontal bars present a lower risk than do vertical bars so the enlarged cap section can be employed preferentially on the vertical bars.

Whilst the above has been given by way of illustrative example of the present invention, many variations and modifications thereto will be apparent to those skilled in the art without departing from the broad ambit and scope of the invention as set forth in the appended claims.

I claim:

1. A reinforcement bar end cap comprising an elongate hollow base having a first cap at one end and being open at its opposite end so that the hollow base is slidable over a free end of reinforcement bar and further comprising a separately formed second cap section Which is larger than said first cap section, the second cap section being attachable to said first cap section to cover the first cap section thereof and thereby provide a cap for the hollow base, said second cap section projecting radially outwardly from said hollow base.

2. A reinforcement bar end cap as claimed in claim 1 wherein the hollow base section is a tube projecting from the first cap section formed integrally with the tube from plastic material, the first cap section having a transverse slot extending between openings on opposite sides of the first section, the second cap section having hand insertable clip means engagable in said slot to secure the second cap section to the first cap section of the hollow base.

3. A reinforcement bar end cap as claimed in claim 2 wherein the second cap section locates on said first cap section and concentrically surrounds said hollow base section.

4. A reinforcement bar end cap according to claim 1 wherein the end cap includes means for receiving and positioning a rigid member across the free end of the reinforcing bar between the second cap section and the hollow base section.

* * * * *